March 28, 1944.  R. T. SANDERSON  2,345,219
GEOCHEMICAL PROSPECTING
Filed Dec. 30, 1939.
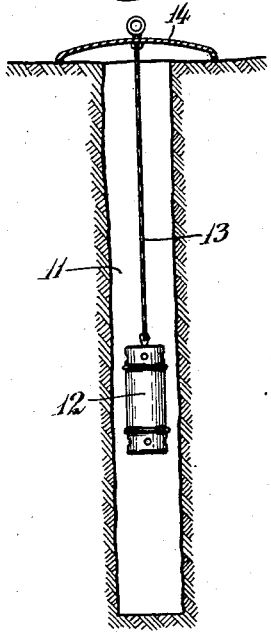
Fig. 1.
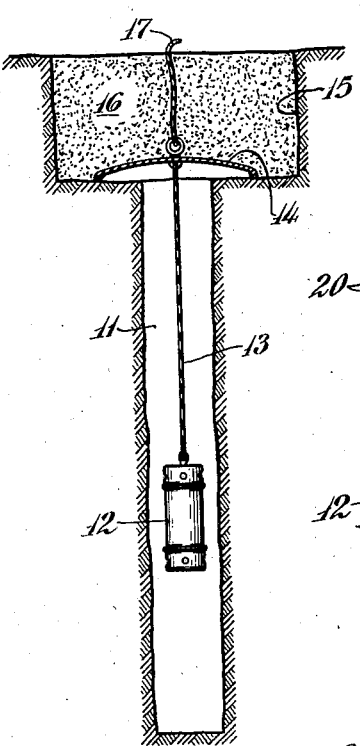
Fig. 2.
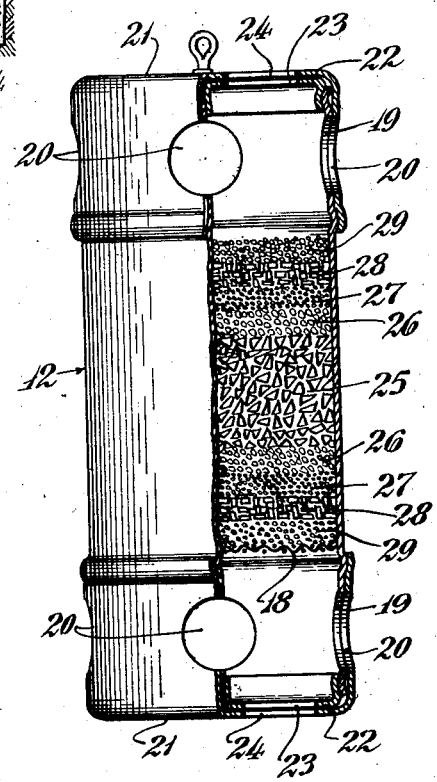
Fig. 3.
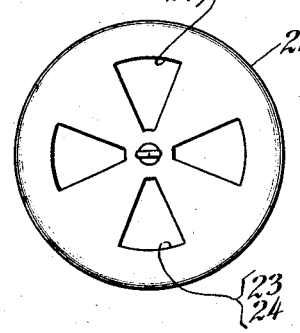
Fig. 4.
Fig. 5.
INVENTOR
Robert Thomas Sanderson
BY
Geo. L. Parkhurst
ATTORNEY Patented Mar. 28, 1944

2,345,219

UNITED STATES PATENT OFFICE 2,345,219

GEOCHEMICAL PROSPECTING

Robert Thomas Sanderson, Sierra Madre, Calif., assignor to Stanolind Oil and Gas Company, Tulsa, Okla., a corporation of Delaware Application December 30, 1939, Serial No. 311,812

11 Claims. (Cl. 23—232)

This invention relates to soil analysis and to soil gas analysis and more particularly to soil analysis and soil gas analysis for purposes of geochemical prospecting. Still more particularly it relates to the collection of samples of soil gas hydrocarbons and the like for analysis as a step in the art of geochemical prospecting.

In recent years increasing attention has been given to the analysis of soils as an aid to the location of deep seated oil and gas deposits. The theory commonly held is that hydrocarbon materials migrate upward from deep seated deposits and are sorbed by the soils. Thus by analysis of these soils for hydrocarbon materials and in some instances for related materials such as hydrogen, some indication of the presence of deep seated petroleum deposits can be had.

However, difficulties are encountered in this method of geochemical prospecting due to the fact that the sorptive capacities and retentivities of surface soils vary widely so that in the course of a survey it is difficult to determine whether anomalies are due entirely to sub-surface conditions or whether they are due in whole or in part to differences in sorptive capacity or retentivity. Furthermore, not only do soils vary markedly in sorptive capacity due to variations in the chemical and physical compositions but the concentration of hydrocarbons and other materials in a given soil may also be dependent on the environmental history of the soil which cannot be known with certainty and which may differ from survey station to survey station.

It is a purpose of my invention to overcome these difficulties and to provide a method of and apparatus for geochemical prospecting which will give more significant and comparable results than the methods and apparatus heretofore used. It is also an object of my invention to provide a particularly convenient method of sample collection in connection with geochemical prospecting. A further object of my invention is to standardize the collection of samples of volatile soil gas components, particularly soil gas hydrocarbons. A still further object of my invention is to provide samples of soil gas hydrocarbons relatively free from contaminating constituents. Still another object is to provide samples of high concentration. Other and more detailed objects, advantages and uses of my invention will become apparent as the description thereof proceeds.

I accomplish these objects by placing in proximity to the soil in question a body of a standardized sorbent having a much higher sorptive power than the soil itself. As will hereinafter appear, it is of great importance to protect the hydrocarbon sorbent from various sorbable constituents of the soil gases other than those which it is desired to measure. Thus it is often desirable to exclude carbon dioxide and ammonia and when using a solid adsorbent it is imperative to exclude water or maintain constant humidity.

Various materials can be used as sorbents for soil hydrocarbons in practicing my invention, but the material chosen should be inexpensive or readily reclaimable or both. It should also be available as a very uniform, well standardized product.

Charcoal, activated carbon and similar carbonaceous sorbents commonly known as activated charcoal are preferred but any other material having a high and/or specific sorptive capacity for hydrocarbons, hydrogen, etc., can be used. Commercial activated charcoal is not generally satisfactory as such since it is usually contaminated with non-constant amounts of hydrocarbons or gases which interfere with the hydrocarbon sorption and especially with the subsequent analysis. Commercial activated charcoal must therefore be thoroughly degassed by some such method as prolonged heating at a high temperature in vacuo before it is fit for use as a standard sorbent in accordance with my invention. By the way of example, degassing can be carried out by heating the activated charcoal to 600° C. for 10 hours at a pressure of about $10^{-5}$ millimeters of mercury although less vigorous treatment is often entirely sufficient. It is advantageous to heat the charcoal, after brief, preliminary evacuation, in an atmosphere of natural (hydrocarbon) gas or other gaseous hydrocarbon or hydrocarbons, before subjecting the charcoal to the rigorous degassing mentioned above. This pretreatment or preliminary sorption of gases the same as or similar to those to be tested results in the displacement of strongly sorbed impurities which may not otherwise be eliminated. After such pretreatment followed by degassing the specific sorptive capacity of the activated charcoal for hydrocarbon gases is higher than if the pretreatment is omitted.

The degassed sorbent can be placed in direct contact with the soil or a layer of a desiccant can be placed next to the soil and the sorbent can be placed in contact with the desiccant. However, it is very strongly preferred to use a container or containers for the sorbent or sorbents.

Thus the preferred method of practicing my invention is to place a weighed amount of standardized sorbent into a properly designed open container and lower the container to the desired depth into a hole in the surface soil, seal the hole from the atmosphere, leave the container in place for a measured period of time, remove it from the hole, transfer the sorbent to a closed container (or close the original container) and then transport the sorbent to a laboratory where the hydrocarbons in particular and also other substances of interest such as hydrogen can be removed by methods normally including the use of heat and vacuum and can be analyzed by various known means.

In the course of a geochemical prospecting operation this method is, of course, carried out for each of a considerable number of survey stations located at suitably spaced points, for instance every tenth mile along a survey line or similarly spaced over a survey area. The results are plotted or compared and high values indicate the presence of underlying, or underlying and adjacent, deep-seated petroleum deposits.

It is preferred that the sorbent be in contact with or in juxtaposition to the soil at a depth of at least three feet rather than having it in juxtaposition to the soil precisely at the surface since there is a tendency for contamination at the surface. Various depths can be used, preferably 3 to 25 feet, for instance 6 or 8 feet.

Certain methods of applying my invention are illustrated by way of example in the accompanying drawing in which:

Figure 1 is a section through a portion of the surface soil showing one method of applying my invention;

Figure 2 is a similar section showing a modified application of my invention;

Figure 3 is an elevation of the sample container shown in Figures 1 and 2;

Figure 4 is a plan view corresponding to Figure 3 showing the sample container open; and Figure 5 is a similar plan view showing the sample container closed.

In one embodiment of my invention, a hole is drilled to a depth of at least several feet as shown in Figure 1. Such holes can be conveniently made with post hole augers or otherwise. The sorbent can, of course, be placed in the bottom of such a hole without using the container but the container is preferred. Moreover, in order to avoid the possibility that the sorbent will be wet by water accumulating in the bottom of the hole it is preferable that the container be supported above the bottom of the hole. Thus, for instance, the hole 11 can be 8 feet deep and the container 12 which may, for instance contain 100 grams of activated charcoal can be supported at a depth of 5 feet. This container 12 is open at both ends and is supported by a chain or cord 13 from a cover 14 which serves various purposes including that of preventing contamination and ingress of surface water into the hole. Another important purpose served by cover 14 is that of preventing the upper atmosphere above the soil from diffusing over the sorbent more readily than the soil atmosphere. If the upper atmosphere could diffuse over the sorbent readily, even if there were no resultant contamination, the effective average concentration of hydrocarbons in the atmosphere about the sorbent would be less than that of the soil atmosphere, and consequently the rate of sorption, or amount of sorption in a fixed period of time, would be lower, and the proportional decrease would vary from location to location. It is therefore important to close the hole so that the atmosphere above the surface may have no more ready access to the sorbent than the soil atmosphere; preferably far less ready access than the soil atmosphere.

This sealing of the hole from the upper atmosphere can be accomplished in a preferred manner, as shown in Figure 2, by excavating an enlarged hole 15 at the upper part of hole 11 and placing cover 14 at the bottom of this enlarged hole. After cover 14 carrying sample container 12 has been put in place the enlarged hole 15 can be filled in with earth 16 or otherwise to do a thorough sealing job. Rope 17 attached to cover 14 is allowed to protrude above the surface to serve as a marker.

The sorbent should be left in position for a period of at least several hours, for instance overnight and it is sometimes desirable to leave it in place for a matter of several days or even several weeks. For any given survey, of course, the sorbent used at the various survey stations should be identical in nature and condition, equal in amount, should be similarly spaced with regard to the soil and should be left in place for the same length of time. Not only should the length of time the sorbent is in place be constant from survey station to survey station but the actual period should be the same insofar as is conveniently possible since temperature conditions and other factors are not without effect. Thus one sample left in place for 24 hours on a hot day might not be comparable with results obtained at another survey station on a cooler day.

After the sample has been left in communication with the soil as shown in Figure 1 or Figure 2 for the desired period, it or a selected part of it is removed, for instance, by careful manipulation or by the use of known sampling devices, and taken to the laboratory for analysis as previously described.

As shown in Figures 3, 4 and 5, one suitable form of container is provided with a screen 18 on which the sorbent or sorbents rest and the sides of the container extend both above and below that part of the container which is filled with sorbent or sorbents. The upper and lower parts of the side wall of the container are provided with openings 19 which cooperate with openings 20 in caps 21. Also in a preferred form, the top and bottom of container 12 are provided with removable inner covers 22 having openings 23 which cooperate with openings 24 in caps 21. As seen in Figures 3 and 4, the container is open both at the upper and lower parts of the side wall and at the top and bottom to provide maximum ventilation or, in other words, maximum ingress of soil gas to the sample container. In Figure 5 the openings 23 and 24 are shown in closed position and with caps 21 in this position the side wall openings are likewise closed. The container is, of course, kept in closed condition except when actually in place in juxtaposition to the soil.

One complicating factor in the method which I have devised is the effect of water sorption on the sorption of hydrocarbons. Thus, if the amount of water present varies markedly, the amount of hydrocarbon sorbed may be influenced by the water sorption. This can be minimized by the use of sorbents which have a selective or specific effect on hydrocarbons as compared with water. This is true of activated charcoal and the like to a limited extent and is markedly true of heavy hydrocarbon oils, petroleum jellies, etc., the use of which will be mentioned hereinafter.

In using solid adsorbents it is important, in fact practically imperative, to provide some solution for the problem of errors introduced by water sorption. This can be done by various methods of which the simplest is merely to use the sorbent in an initially thoroughly dry condition. This, however, is not a complete solution of the problem since non-uniform sorption of water vapor during the sampling operation causes non-uniform effects on the hydrocarbon sorption.

Perhaps the best solution is to control the humidity of the atmosphere to which the sorbent is subjected. Thus, for instance, an excess of water can be placed in the bottom of the hole in a separate container so that the atmosphere in the hole is always saturated with water. This gives uniformity but greatly reduces the sorptive power of the sorbent for hydrocarbons. Moreover, the porosity of the soil and the constant ingress of gases into the hole makes this method a relatively unsatisfactory one.

Accordingly it is much better to achieve uniformity by keeping the humidity low rather than high, i. e., by keeping the atmosphere in the hole as dry as possible. One way of accomplishing this is by putting into the bottom of the hole a quantity of dehydrating agent, for instance calcium chloride although this is by no means an ideal solution to the problem because of the constant ingress of moisture-laden gases into the hole from the soil. A far better method is that shown in Figure 3 in which the dehydrating agent is in immediate proximity to the sorbent.

As illustrating the problem, an activated charcoal which adsorbed 1.15% of its weight of water when exposed to air containing water vapor having a partial pressure of 5.15 millimeters of mercury absorbed 39.33% of water when the partial pressure was 23.76 millimeters of mercury. These differences in water sorption greatly affect the hydrocarbon sorption and thus lead to non-comparable results. On the other hand, this same activated charcoal would sorb only 0.15% of water from air dried over anhydrous or relatively anhydrous calcium chloride and when all samples in a given survey are taken in atmospheres thus dried the effect of water becomes completely negligible.

Instead of calcium chloride other desiccants, for instance magnesium perchlorate, can be used.

It is also desirable to protect the sorbent for hydrocarbons from acidic and basic gases, such as carbon dioxide and ammonia. Ascarite (a commercial material containing potassium hydroxide and asbestos) or fused potassium or sodium hydroxide or other basic or alkaline reagents can be used as acidic gas removal reagents while sodium bisulfate and various acidic reagents can be used as reagents for removing ammonia and other alkaline or basic gases.

Figure 2 shows a large mass 25 of standardized hydrocarbon sorbent, e. g., dried, degassed activated carbon, above and below it thick layers 26 of water sorbent, e. g., calcium chloride, then thin layers 27 of carbon dioxide removal reagent, e. g., Ascarite, next thin layers 28 of ammonia removal agent, e. g., sodium bisulfate, and on the outside if desired, thick layers 29 of a water removal agent, e. g., calcium chloride. One or more of layers 26, 27, 28 and 29 can be omitted. The sequence of the layers can be varied so long as the hydrocarbon sorbent is on the inside. However, if water is generated by one of the other sorbents, for instance by the interaction of KOH and $CO_2$, a layer or layers of water removal agent should surround the hydrocarbon sorbent.

For the most part my invention has been described in connection with the use of solid adsorbents for taking the hydrocarbon samples. However, other sorbents, for instance liquids such as heavy mineral oils and semi-fluid materials such as petroleum jellies can also be used. These materials do not have the surface sorption action typical of activated charcoal and the like but do have a good sorptive action or solvent power for hydrocarbons, such as the light hydrocarbons found in soil gases. Moreover, these hydrocarbon solvents have the great advantage that they are not likely to be seriously affected by water, carbon dioxide, ammonia, etc., so that it is not usually necessary to protect them from these soil constituents.

By way of example a petroleum jelly (a commercial composition containing lubricating oil and petrolatum wax) was found to be a sorbent for gaseous hydrocarbons. Moreover, these can be driven off for analysis by heating at 210° C. for fifteen minutes under a moderate vacuum.

When using a solid adsorbent such as activated charcoal the sorbed hydrocarbons can be driven off by heating the sorbent in vacuo or in a stream of inert gas. For instance they can be driven off by heating for 30 minutes at a temperature of 250° C. under a pressure of $10^{-5}$ millimeters of mercury. The hydrocarbons thus driven off can be purified, condensed in a liquid air or liquid nitrogen trap and analyzed or measured by various methods known to the art.

The methods outlined in the preceding paragraph for driving off the sorbed gases are often not entirely satisfactory since the gases are not completely driven off at convenient temperatures in a reasonable time while at higher temperatures decomposition of the sorbed gases and chemical reactions between some of the various substances present are likely.

I propose, therefore, that the sorbent containing the gases to be analyzed be treated with an excess of a readily sorbed gas or liquid or low-melting solid, inert with respect to the sorbent and to the gases to be analyzed, and differing from them either physically or chemically, so as to simplify their subsequent separation. The sorbed gases to be analyzed are displaced and separated for final analysis.

This displacement method is also applicable to samples of the soil itself.

The displacement substance should ideally be:
(1) Strongly sorbed by the sorbent or soil, and therefore, preferably of low molecular volume; and
(2) Easily separable from the hydrocarbons to be measured; hence,
(a) Of different volatility than the hydrocarbons, preferably less volatile;
(b) Stable toward moderate heat;
(c) Chemically inert with respect to hydrocarbons;
(d) Relatively active chemically.

As examples of such displacement substances ammonia or organic amines can be used and can be removed from the displaced vapors by washing with acid, e. g., sulfuric acid. Isonitriles can be used as displacement substances. Decane and other heavy hydrocarbons can be used and can be separated from the lighter soil hydrocarbons by fractional distillation.

These displacement substances can be added to the soil or sorbent in amounts ranging from 1% to 100% of the soil or sorbent. Some heating is then usually necessary but no more (often much less) than when no displacement substance is used and the separation of hydrocarbons from the sorbent is more nearly complete. Vacuum and/or a stream of inert gases can be used to help remove the originally sorbed substances. The displacement substance is then removed from the displaced gases by physical or chemical means and the displaced gases are measured or analyzed.

While I have described my invention in connection with certain preferred embodiments thereof, it will be understood that these are by way of illustration rather than by way of limitation and that I do not mean to be restricted thereto except as defined in the appended claims.

I claim:

1. A method of geochemical prospecting comprising placing a container containing a standard body of sorbent for hydrocarbon gases in holes located in accordance with a spaced survey pattern, said sorbent being protected by at least one material which will remove at least one soil gas constituent selected from the group consisting of water vapor, acidic constituents and alkaline constituents from the atmospheres in the holes but which will permit free access of the hydrocarbon constituents to said sorbent, removing said containers from the holes after substantially equal periods of time sufficient to permit enough hydrocarbons to be sorbed by the sorbent, removing at least part of said bodies or sorbent from the containers, displacing sorbed hydrocarbons from said sorbent by adding a displacement substance thereto, and analyzing the hydrocarbons thus displaced.

2. A method of geochemical prospecting comprising placing a container containing a standard body of sorbent for hydrocarbon gases in holes located in accordance with a spaced survey pattern, said sorbent being protected by a material which will remove acidic constituents from the atmospheres in the holes but which will permit free access of the hydrocarbon constituents to said sorbent, removing said containers from the holes after substantially equal periods of time sufficient to permit enough hydrocarbons to be sorbed by the sorbent, removing at least part of said bodies of sorbent from the containers, displacing sorbed hydrocarbons from said sorbent by adding a displacement substance thereto, and analyzing the hydrocarbons thus displaced.

3. A method of geochemical prospecting comprising placing a container containing a standard body of sorbent for hydrocarbon gases in holes located in accordance with a spaced survey pattern, said sorbent being protected by a material which will remove alkaline constituents from the atmospheres in the holes but which will permit free access of the hydrocarbon constituents to said sorbent, removing said containers from the holes after substantially equal periods of time sufficient to permit enough hydrocarbons to be sorbed by the sorbent, removing at least part of said bodies of sorbent from the containers, displacing sorbed hydrocarbons from said sorbent by adding a displacement substance thereto, and analyzing the hydrocarbons thus displaced.

4. A method of geochemical prospecting comprising placing a container containing a standard body of sorbent for hydrocarbon gases in holes located in accordance with a spaced survey pattern, said sorbent being protected by a material which will remove water vapor, acidic constituents and alkaline constituents from the atmospheres in the holes but which will permit free access of the hydrocarbon constituents to said sorbent, removing said containers from the holes after substantially equal periods of time sufficient to permit enough hydrocarbons to be sorbed by the sorbent, removing at least part of said bodies of sorbent from the containers, displacing sorbed hydrocarbons from said sorbent by adding a displacement substance thereto, and analyzing the hydrocarbons thus displaced.

5. A method of geochemical prospecting comprising placing a container containing a standard body of sorbent for hydrocarbon gases in holes located in accordance with a spaced survey pattern, said sorbent being protected by a material which will remove carbon dioxide from the atmospheres in the holes but which will permit free access of the hydrocarbon constituents to said sorbent, removing said containers from the holes after substantially equal periods of time sufficient to permit enough hydrocarbons to be sorbed by the sorbent, removing at least part of said bodies of sorbent from the containers, displacing sorbed hydrocarbons from said sorbent by adding a displacement substance thereto, and analyzing the hydrocarbons thus displaced.

6. A method of geochemical prospecting comprising placing a container containing a standard body of sorbent for hydrocarbon gases in holes located in accordance with a spaced survey pattern, said sorbent being protected by a material which will remove ammonia from the atmospheres in the holes but which will permit free access of the hydrocarbon constituents to said sorbent, removing said containers from the holes after substantially equal periods of time sufficient to permit enough hydrocarbons to be sorbed by the sorbent, removing at least part of said bodies of sorbent from the containers, displacing sorbed hydrocarbons from said sorbent by adding a displacement substance thereto, and analyzing the hydrocarbons thus displaced.

7. Apparatus for geochemical prospecting comprising a container, a mass of hydrocarbon sorbent in said container, said container being provided with openings to subject said sorbent to soil gases, a layer of a chemical reagent disposed between said openings and said sorbent, said chemical reagent having a selective removal action on at least one soil gas constituent selected from the group consisting of water, carbon dioxide and ammonia, and means connected to said container for suspending said container in a shallow well and for minimizing access of atmospheric air to said container.

8. Apparatus for geochemical prospecting comprising a container, a mass of hydrocarbon sorbent in said container, said container being provided with openings to subject said sorbent to soil gases, a layer of a water removal reagent disposed between said openings and said sorbent, a separate layer of a reagent for the removal of gases selected from the group consisting of acidic and basic gases disposed between said first-mentioned layer and said sorbent, and means for suspending said container in a shallow well.

9. Apparatus for geochemical prospecting comprising a container, a mass of hydrocarbon sorbent in said container, said container being provided with openings to subject said sorbent to soil gases, a layer of a water removal reagent disposed between said openings and said sorbent, a separate layer of a reagent for the removal of gases selected from the group consisting of acidic and basic gases disposed between said first-mentioned layer and said sorbent, a second layer of a water removal reagent disposed between said last-mentioned layer and said sorbent, and means for suspending said container in a shallow well.

10. Apparatus for geochemical prospecting comprising a container, a mass of hydrocarbon sorbent in said container, said container being provided with openings to subject said sorbent to soil gases, a layer of a water removal reagent disposed between said openings and said sorbent, separate layers of reagents for the removal of acidic and basic gases disposed between said first-mentioned layer and said sorbent, and means for suspending said container in a shallow well.

11. Apparatus for geochemical prospecting comprising a container, a mass of hydrocarbon sorbent in said container, said container being provided with openings to subject said sorbent to soil gases, a layer of a water removal reagent disposed between said openings and said sorbent, separate layers of reagents for the removal of acidic and basic gases disposed between said first-mentioned layer and said sorbent, a second layer of a water removal reagent disposed between said last-mentioned layers and said sorbent, and means for suspending said container in a shallow well.

R. THOMAS SANDERSON.